J. T. TOOLOOSE.
TIRE TUBE PROTECTOR.
APPLICATION FILED AUG. 15, 1916.
1,235,080.
Patented July 31, 1917.
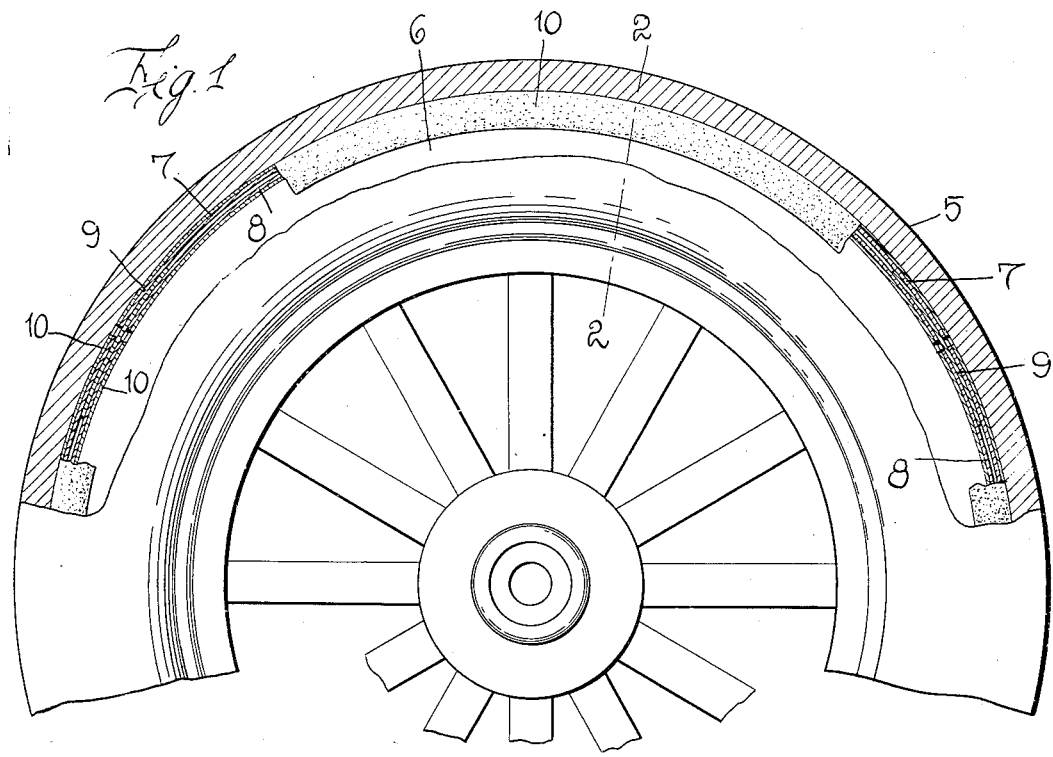
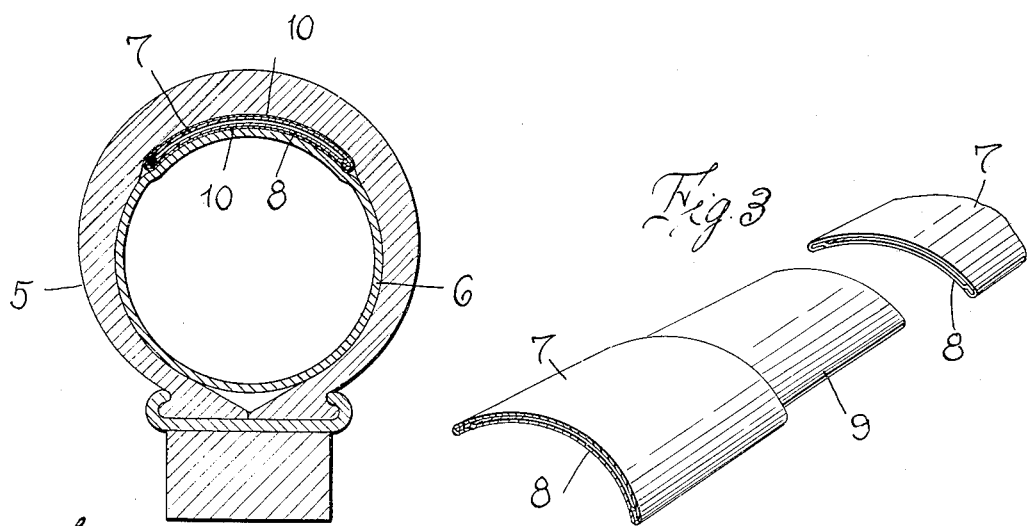
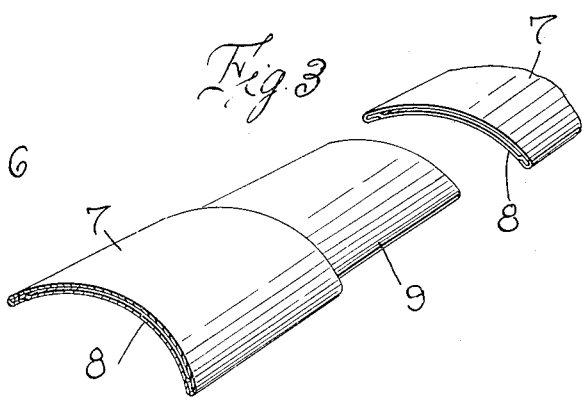
Inventor
J. T. TOOLOOSE
By Watson E. Coleman
Attorney

UNITED STATES PATENT OFFICE.

JOHN T. TOOLOOSE, OF PLATTIN, MISSOURI.

TIRE-TUBE PROTECTOR.

1,235,080.  Specification of Letters Patent.  Patented July 31, 1917.

Application filed August 19, 1916. Serial No. 115,875.

*To all whom it may concern:*

Be it known that I, JOHN T. TOOLOOSE, a citizen of the United States, residing at Plattin, in the county of Jefferson and State of Missouri, have invented certain new and useful Improvements in Tire-Tube Protectors, of which the following is a specification, reference being had to the accompanying drawings.

This invention relates to an improved tire tube protector and has for its primary object to provide means whereby the possibility of puncture of the inner tube by nails or other sharp objects penetrating the outer casing is entirely obviated.

It is another and more particular object of the invention to provide a sectional steel protector adapted to be disposed between the inner tube and the tire casing, each of said sections being formed of two spaced thicknesses of metal and having a longitudinally projecting tongue secured therebetween at one end for telescopic engagement between the spaced metal walls of an adjacent section, each of said sections being preferably covered with felt to prevent abrasion of the tire casing or tube.

It is an additional general object of the invention to provide a device for the above purpose which is exceedingly simple and inexpensive in its construction, as well as highly effective and reliable for the purpose in view.

With the above and other objects in view, my invention consists in the novel features of construction, combination and arrangement of parts to be hereinafter more fully described, claimed and illustrated in the accompanying drawing, in which, Figure 1 is a side elevation of a portion of a vehicle wheel, the tire being shown in section and having my improved tube protector applied thereto;

Fig. 2 is an enlarged transverse section taken on the line 2—2 of Fig. 1; and

Fig. 3 is a detail perspective view of the opposed end portions of adjacent sections of the protector.

Referring in detail to the drawing, 5 designates the casing of a pneumatic tire which is adapted to be secured upon the wheel rim in any approved manner, and 6 designates the inflatable inner tube.

My improved protector consists of three or more sections of arcuate form. Each of these sections consists of two sheet steel plates designated 7 and 8 respectively, and the outer plate 7 has its edges bent inwardly and crimped upon the longitudinal edges of the inner plate 8. The intermediate portions of these plates 7 and 8 are spaced from each other and are transversely curved in concentric relation, as clearly shown in Fig. 2. In one end of each section of the protector, a longitudinally projecting transversely curved, sheet metal tongue 9 is securely fixed and is adapted to be fitted into the space between the spaced walls 7 and 8 of an adjacent section of the protector. The several sections, when properly connected and disposed around the inner tube, are of slightly less circumferential extent than said tube so that the tongues 9 may slide or shift within the ends of the several sections when the tube is compressed.

The inner and outer faces of the walls 7 and 8 of the protector are covered with felt or other suitable material indicated at 10, so that they will not chafe or wear the outer casing or the inner tube of the tire.

From the foregoing description, taken in connection with the accompanying drawing, the construction, manner of use and several advantages of the invention will be clearly and fully understood. It will be seen that I have produced a very simple and serviceable tire tube protector which can be easily and quickly applied and will effectually prevent puncture of the inner tube by nails or other sharp articles which may penetrate the tire casing. The protector is very light in weight, as well as strong and durable, and in view of its exceedingly simple construction it is manifest that the same can be manufactured and sold at relatively small cost.

While I have shown and described the preferred construction and arrangement of the several parts of the device, it is to be understood that the same are susceptible of considerable modification therein and I, therefore, reserve the privilege of adopting all such legitimate changes as may be fairly embodied within the spirit and scope of the invention as claimed.

Having thus fully described my invention, what I desire to claim and secure by Letters Patent is:—

The combination with a pneumatic tire including an outer casing and inner tube, of a protector for the tube consisting of a plurality of sections each having spaced, concentric sheet metal walls and a longitudinally projecting tongue fixed between said walls at one end of the section for sliding engagement between the spaced walls of an adjacent section, said sections of the protector having relative circumferential movement between the tire casing and the tube.

In testimony whereof I hereunto affix my signature in the presence of two witnesses.

JOHN T. TOOLOOSE.

Witnesses:
R. B. JONES,
EMMA REICHERT.